Patented Apr. 23, 1929.

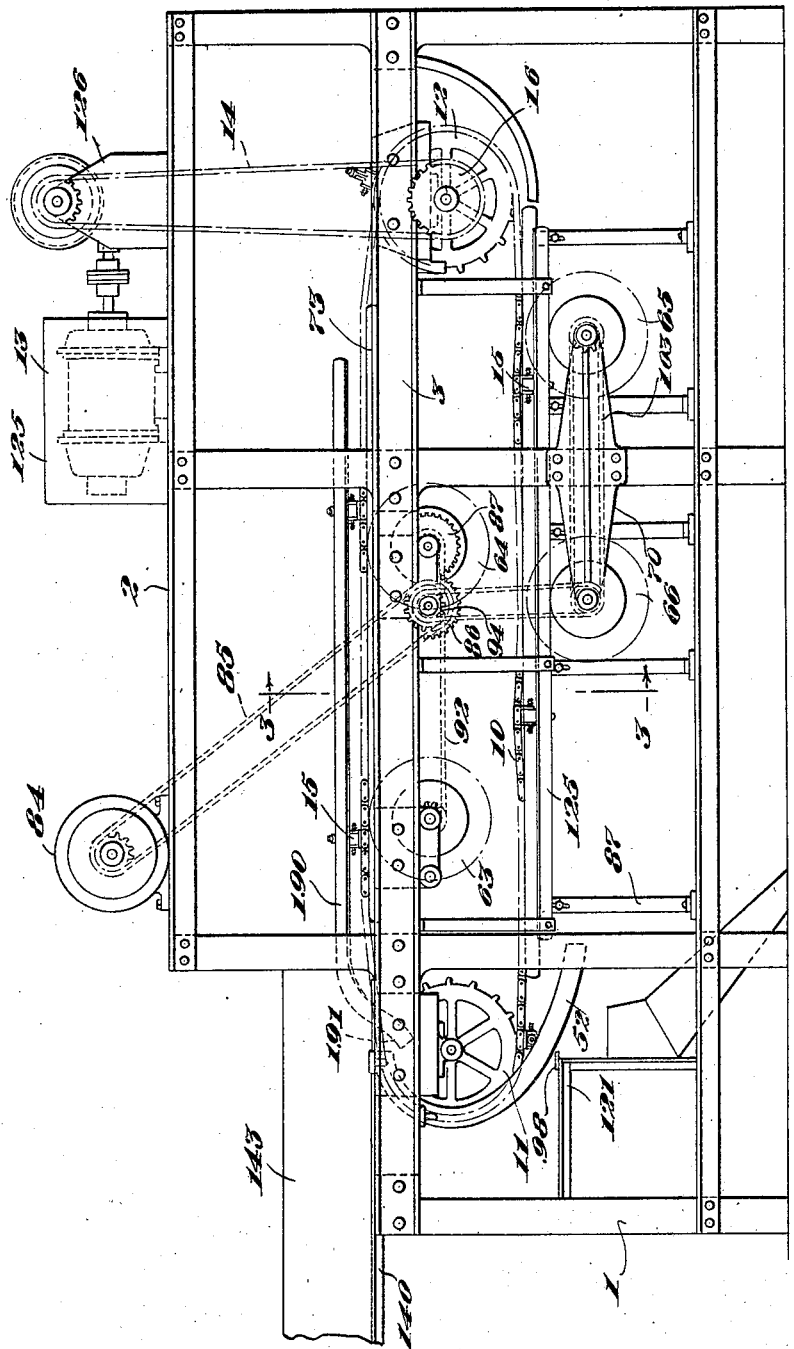

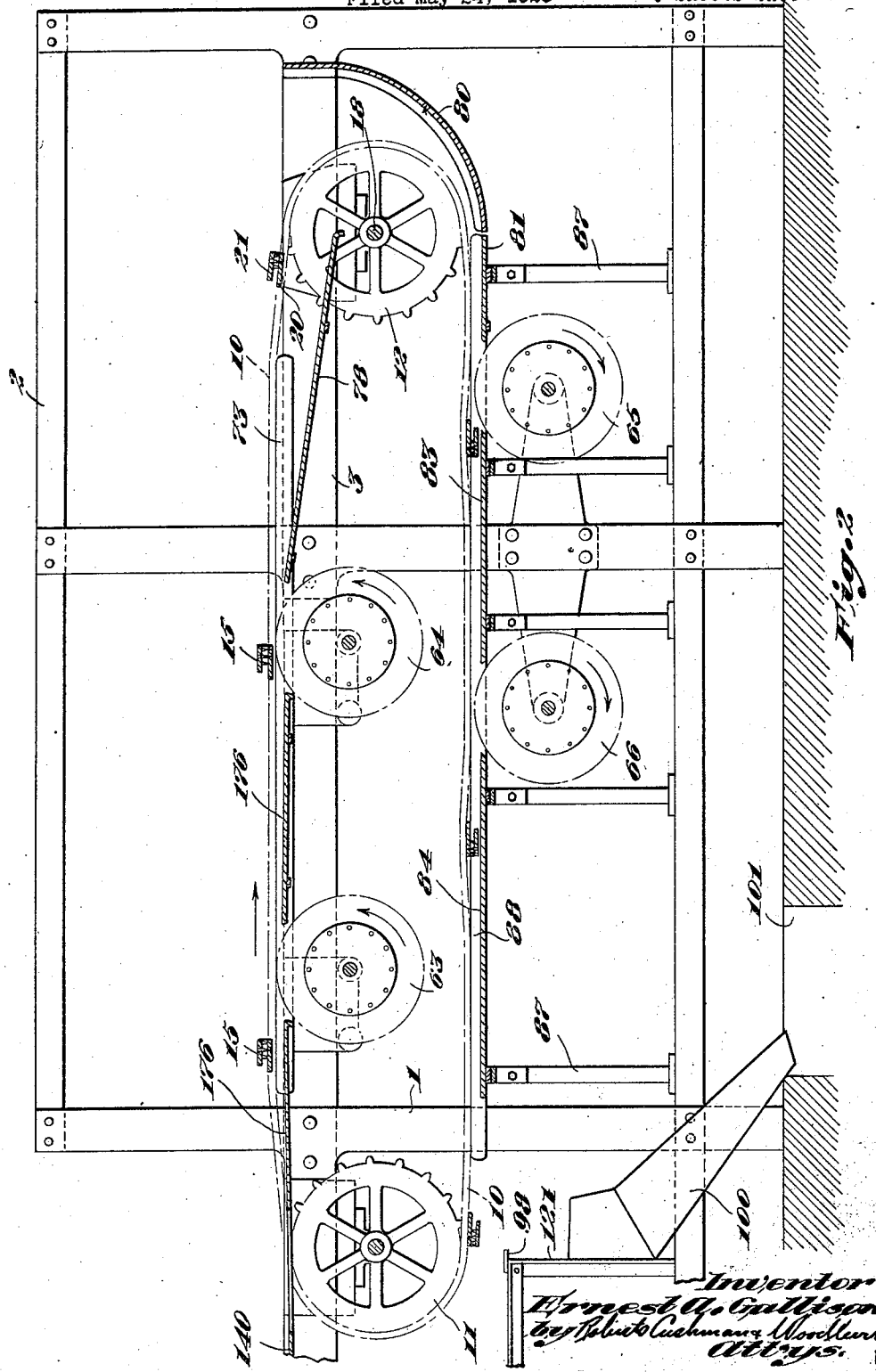

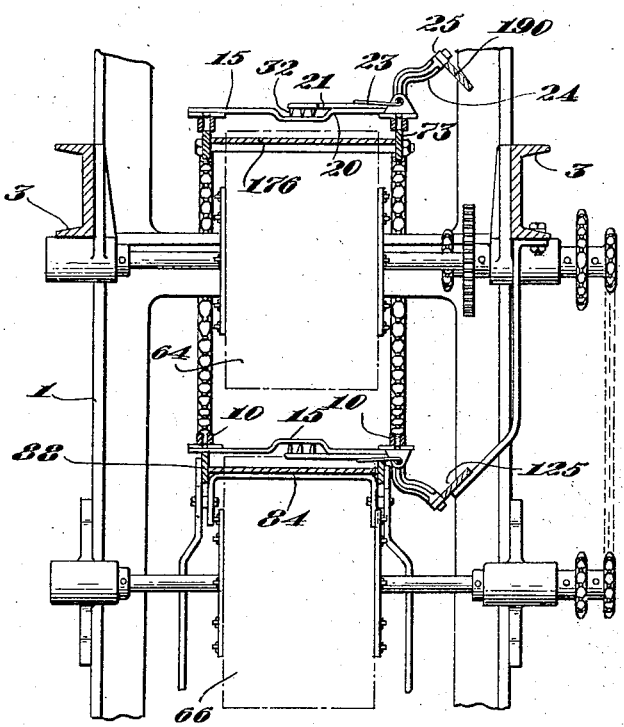
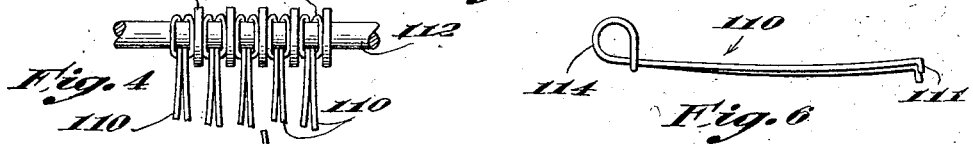
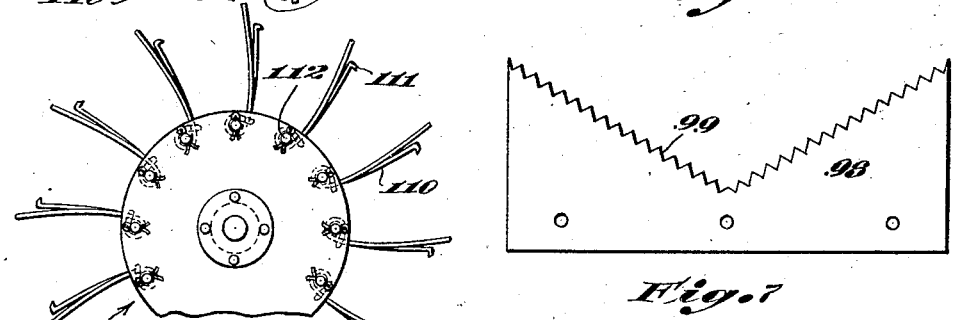
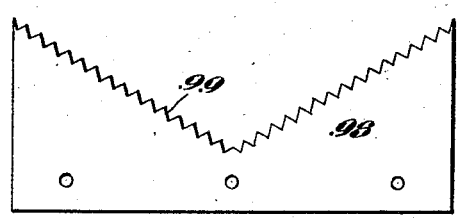

1,709,909

UNITED STATES PATENT OFFICE.

ERNEST A. GALLISON, OF WATERTOWN, MASSACHUSETTS, ASSIGNOR TO BAY STATE FISHING COMPANY, OF BOSTON, MASSACHUSETTS, A CORPORATION OF MAINE.

FISH-SCALING MACHINE.

Application filed May 24, 1928. Serial No. 280,230.

This invention relates to a machine for removing the scales from fish, being adapted to receive fish rapidly fed thereto by a single operator or by any desired means, to remove the scales, and to emit the fish at a convenient point for further cutting or packing operations.

The removal of scales from fish by mechanical means presents considerable difficulty, particularly when there is any substantial variation in the size of the fish. It is necessary to arrange means to permit the yieldable engagement of the scale removing factor or factors with the fish body, said factors necessarily being arranged to have a sufficiently effective engagement with the fish to remove its scales while avoiding the cutting or tearing of its skin or the bruising of its flesh. Since it is necessary for the scale-removing factor or factors to conform to the curved surface of the fish body and to the irregular shape of the same, it appears essential to make these factors somewhat yieldable and at the same time to avoid too great harshness of action when the yieldable portions of the scale-removing factor are engaged by the largest portion of the fish body. The difficulties of this problem are further enhanced when successive fish vary considerably in size. The present invention is designed to obviate these difficulties and to a large extent comprises an improvement upon my earlier machine disclosed in copending application No. 169,623, filed February 19, 1927.

The improved machine disclosed herein may include scale-removing factors having yieldably mounted spills, the movement of which from their normally distended position is not opposed with a progressively increasing resistance; thus too harsh an action upon the fish is avoided. This machine is particularly adapted to make use of means whereby fish of varying sizes may be effectively acted upon by the scale-removing factors, the action upon fish with comparatively large bodies not being substantially more harsh than upon the fish having bodies of ordinary size. To this end the present machine is provided with conveyor mechanism designed to drag one side of the fish body over a scale-removing factor or factors and to turn the body over to drag the other side thereof over a scale-removing factor or factors. Thus the fish body is adapted automatically to locate itself and to flatten itself somewhat in relation to the scale-removing spills and may have a limited lateral yieldability in response to its engagement with a plurality of spills at substantially the same time. Such an arrangement has been found even more effective than that disclosed in my copending prior above-identified application in permitting the rapid removal of scales from a large number of fish by mechanical means.

Objects of the invention, among others, are to provide a fish-scaling machine which is adapted to receive fish varying in size and to remove the scales from substantially all portions of the fish at a comparatively rapid rate and without injury to the fish body itself, at the same time being efficient and effective in operation and requiring the minimum of attention upon the part of the operator.

In the drawings:

Fig. 1 is a side elevational view of the improved fish-scaling machine with the driving means therefor;

Fig. 2 is a central longitudinal section of the same;

Fig. 3 is a section on line 3—3 of Fig. 1;

Fig. 4 is an elevational detail of a scale-removing brush;

Fig. 5 is an elevational view of a portion of a scale-removing brush;

Fig. 6 is a view of one of the brush spills; and

Fig. 7 is a top plan of a member to detach the fish from a clamp.

A machine of the type disclosed in the accompanying drawings preferably is provided with a supporting frame 1 which may conveniently be of standardized metal members to provide an upper platform 2 and longitudinal frame members 3 below the platform 2 and extending outward beyond one end of the same for purposes which will hereinafter be described. This frame is provided with suitable brackets and hangers for supporting the various component elements and factors of the machine.

Conveyor means is provided to draw the fish past the scale-removing elements or brushes and comprises a pair of parallel endless chains 10 which have substantially horizontal runs between sprockets 11 and 12. These chains are driven from a motor 13 by any suitable driving means such as chain 14 and sprocket 16 and both chains move at the same speed, the sprockets 12, and the drive sprocket 16 being keyed to a common shaft 18. Chains 10 are spaced apart an appropriate distance to support a plurality of fish-engaging clamps or grippers 15.

Each of the clamps 15 comprises a lower portion 20 having its ends secured to the chains 10 and having a body portion bridging the distance therebetween, Fig. 3. The intermediate portion of this clamp is preferably depressed and arranged to interfit with prongs 32 which are carried upon the upper clamp member 21 that is pivotally mounted on one end of member 20. A spring 23 is arranged yieldably to urge member 21 downwardly toward member 20. Member 21 preferably carries an outstanding arm 24 at the end of which is disposed a roller 25, the latter being adapted to engage suitable guiding elements to effect opening and closing of the clamp, it being evident that this clamp is of the same general type as more particularly disclosed and claimed in my above-identified copending application.

Adjoining sprocket 11 is the curved guide 52 which may be supported in any convenient manner upon frame 1. This guide is shown more particularly in Fig. 1 and provides an edge to engage rollers 25 upon successive clamps 15, thus opening the clamps to the greatest degree when they arrive at a point adjoining the feed table 140. The tail of a fish hanging over a clamp at this point is then suddenly engaged by the closing of the clamp as the roller 25 leaves the guide element 52 and the spring 23 causes the member 21 with its prongs 32 to penetrate the fish which will be gripped between members 21 and 20.

The longitudinal guide strip 190 is disposed adjoining the upper run of chain 10 to have an edge closely paralleling the path of the rollers 25 so that accidental opening of the clamps is avoided. A downwardly extending end portion 191 of this guide strip terminates beneath the end of the guide member 52 and is adapted to cause positive closing of the clamps, if the springs 23 should for any reason fail to function.

The feed table 140 and guard 143 are located upon the longitudinal extension of the frame 1 which is provided by members 3. Feed table 140 receives fish which are fed tail foremost in the direction of the scale-removing elements and is preferably provided with a box-like upward extension or guard 143 substantially to enclose the clamps 15 until they arrive at their fully opened position where they engage the tail of a fish. This guard serves to protect the hands of the operator and to prevent the fish engaging a partially opened clamp.

Clamps 15 will drag the fish over scale-removing elements 63 and 64, and 65 and 66. The brushes or scale-removing factors 63 and 64 are arranged so that, when rotating at high speed, their upper portions are substantially on a level with the upper runs of conveyor chains 10. The lower scale-removing factors 65 and 66 may be disposed upon opposite ends of a suitable arm 70, the intermediate portion of which is secured upon an upright of frame 1, members 65 and 66 having their upper portions similarly arranged in relation to the lower runs of chains 10 as shown. The scale-removing elements may preferably be in the form of brushes one of which is shown more particularly in Fig. 4. Brush 63, for example, may preferably be of the general type disclosed in the copending application of Raymond C. Mudge and Ernest A. Gallison No 169,607, filed on February 19, 1927. The brush is preferably provided with spills 110, which may conveniently comprise metal strips or wires, that are bent so that their ends are outstanding. One or both of these wire ends may be hooked, as indicated at 111, Figs. 4 and 6. The intermediate portion of each wire spill preferably comprises a loop 114 turned about the outstanding portions, these loops are spaced by washers 115 and are mounted on support bars 112 upon the rotatable brush frame. Thus the wire ends are normally thrown outwardly under the action of centrifugal force.

When the brush frame is rotated, centrifugal force tends to throw the spill portions outwardly whereby the ends of the spills are yieldably cast against the surface of the fish. The hooked end portions of the spills and the yieldable mounting of the same are important features of the brush which permit more effective cleaning of scales from the fish.

The longitudinally disposed bars 73 are adapted to form supports for the chain portions extending between the brushes. Adjustable connecting elements between these bars also support plates 176 which are adapted to hold fish at a proper level as they pass to the scale-removing elements 63 and 64. Beyond the second brush 64 I provide a downwardly sloping plate 78 arranged to support the fish body as it leaves the second scale-removing factor. This plate 78 preferably terminates adjoining the shaft 18 which connects sprockets 12, Fig. 2. From an inspection of this figure it will be evident that the plates 176 and 78 are arranged slightly below the highest portion of the scale-removing brushes as the location of this portion is determined by the rotation of the brushes at high speed during normal operation of the device. Accordingly, the fish body tends to lift and flex upwardly somewhat when passing over the scale-removing factor, thus having various portions of its curved surface passed into engagement with the ends of the rapidly moving spills so that the scales are effectively removed from one side of each fish body, although these bodies may vary considerably in size and/or shape. Spaced outwardly beyond sprockets 12 is a curved guide plate 80 which is adapted to engage the fish body as the clamps swing over and turn the fish upside down. The fish body is engaged by the plate 80 which is so curved as to direct it upon an adjustable, horizontal guide plate 81 arranged in substantially the same relation to the scale-removing factor 65 as the plates 176 are arranged in relation to the upper set of brushes.

A similar guide plate 83 is arranged between brushes 65 and 66 and another adjustable supporting plate 84, is arranged beyond the last-named brush; suitable supporting brackets 87 support these various plates adjoining the lower runs of chains 10. A pair of longitudinally disposed supporting members 88 adjoin the lower runs of chain 10 having their upper surfaces arranged to engage opposite sides of clamps 15. Thus the position of these clamps, as they pass brushes 65 and 66, is accurately defined. A suitable guide member 125 is also arranged adjoining the lower run of the chains 10 in juxtaposition to the path of rollers 25 in order to insure the clamps remaining in their closed position and to avoid accidental disengagement of the fish body from its normal position in relation to the conveyor means. Member 52 is arranged adjoining the sprockets 11 with its edge portion so disposed that it will engage the rollers 25 upon each of the clamps 15 in order to press these rollers inwardly toward the center of the sprockets to swing each clamp member 21 away from the member 20, to open the clamp and to release the fish tail.

A suitable frame 121 supports a plate 98 that has converging edge portions that are provided with a plurality of teeth or prongs 99, these edge portions being arranged to catch the fish body as the clamps open and to insure the movement of the body out of engagement with the prongs 32 upon the clamps, the prongs 99, however, being so short that they serve merely to catch the fish and do not support the same. A suitable downwardly extending chute 100 is arranged below the member 98 and may direct the scaled fish downwardly through an opening 101 to a lower floor where subsequent dressing and packing operations may take place.

While the conveyor mechanism comprising the chains 10 and clamps 15 may be driven from the same source of power which also drives the scale-removing elements, these different parts of the machine preferably are driven from separate sources of power on account of the substantially higher speed of the scale-removing brushes. The brushes are preferably driven by a motor 84 through a chain 85 that drives a spur gear 86, the latter meshing with a gear 87 concentrically mounted upon the axle of brush 64. This axle also carries a sprocket that drives a chain 92 engaging a sprocket upon the axle of brush 63. Rotatably mounted upon the same shaft as sprocket 86 is a second sprocket 94 which is adapted to drive a chain engaging a sprocket upon the same shaft as brush 66. A second sprocket upon this shaft drives a chain 103 which in turn operates the scale-removing factor 65. The sprockets 12 for the conveyor mechanism are driven by a suitable motor 13 enclosed, if desired, in housing 125 and driving a chain 14 through a suitable reduction gear mechanism 126, chain 14 engaging the sprocket 16 which is keyed to the shaft 18.

Rotation of the scale-removing elements tends to throw the scales upon a portion of the floor where an opening may be provided for reception of the scales, if desired.

The operation of the machine is substantially as follows:

Fish are placed upon a groove in feeding table 140, which is of the general type disclosed in my above-identified copending application, with their tails hanging over the edge of the same in a position to be grasped and penetrated by clamps 15 which close thereon due to the arrangement of springs 23 and guide element 52, the depressed extension 191 of guide strip 190 positively insuring substantial closing of the clamps. The fish is then drawn by the clamps over plates 176 and over successive scale-removing elements 63 and 64. The fish is thereupon carried to a position where the body thereof is swung over into engagement with the curved plate 80, the fish body thus being turned over and its unscaled side passed over plate 81, scale-removing factor 65, plate 83, scale-removing factor 66 and plate 84 in succession. As the scaled fish approaches the sprockets 11 the clamp is opened by guide member 52 and a portion of the fish body adjoining the tail is engaged by the member 99 which, cooperating with the weight of the larger portion of the body, lifts the tail portion out of engagement with the prongs 32 upon clamps 15 so that the fish is released and passes downwardly to chute 100.

It is evident that fish bodies of various sizes and accordingly of various weights are adapted to depress the scale-removing spills to different degrees; these spills being yieldably urged outward under the action of the centrifugal force, however, do not provide progressively increasing resistance to this action. Thus undue harshness of these factors in relation to fish bodies of the larger sizes is avoided. It is furthermore evident that this manner of dragging the fish bodies over the scale-removing spills permits the former to have a limited movement in all directions; this yieldability is particularly desirable to prevent cutting or tearing of the fish flesh, while the yieldability of these bodies permits their surfaces in engagement with the brushes to be somewhat flattened, thereby aiding the removal of scales.

Preferably the brushes rotate in the direction indicated by the dot and dash arrows of Fig. 2, i. e., in a direction such that the portions thereof which engage the fish are moving opposite to the direction of movement of the fish itself and their yieldably mounted spills permit the brushes to conform to the shape of the body of each fish as it passes between them.

I claim:

1. A machine of the class described comprising a conveyor mechanism and a plurality of scale-removing factors, said conveyor mechanism being arranged to drag a fish past a scale-removing factor so that scales are removed from one side thereof, to turn the fish over and to drag the opposite side of the fish past a scale-removing factor to remove the scales from the opposite side of the fish.

2. A machine of the class described comprising a conveyor mechanism and a plurality of scale-removing factors, said conveyor mechanism comprising endless flexible means and being movable about a continuous circuit, said mechanism being designed to drag a fish past a scale-removing factor so that scales are removed from one side thereof, to turn the fish over and to drag the opposite side of the fish past another scale-removing factor to remove the scales from the opposite side of the fish.

3. A machine of the class described comprising a conveyor mechanism and a plurality of scale-removing factors, said conveyor mechanism comprising endless flexible means and being movable about a continuous circuit, said mechanism being designed to drag a fish past a scale-removing factor so that scales are removed from one side thereof, to turn the fish over and to drag the opposite side of the fish past another scale-removing factor to remove the scales from the opposite side of the fish, and means associated with the flexible means to engage a fish and carry it substantially about one continuous circuit.

4. A machine of the class described comprising a conveyor mechanism, a plurality of scale-removing factors having yieldably mounted spills, said conveyor mechanism comprising an endless flexible member movable about supports and having upper and lower substantially horizontal runs therebetween, a clamp upon the flexible member, and scale-removing factors adjoining both upper and lower runs of the flexible member, whereby the conveyer mechanism may drag a fish past a scale-removing factor so that scales are removed from one side thereof, and then turn the fish over and drag the opposite side of the fish past a scale-removing factor to remove the scales from the opposite side thereof.

5. A machine of the class described comprising a conveyor mechanism, a plurality of scale-removing factors having yieldably mounted spills, said conveyor mechanism comprising an endless flexible member movable about supports and having upper and lower runs therebetween, a clamp upon the flexible member, and scale-removing factors adjoining both the upper and lower runs of the flexible member, whereby the conveyor mechanism may drag a fish past a scale-removing factor so that scales are removed from one side thereof, and then turn the fish over and drag the opposite side of the fish past a scale-removing factor to remove the scales from the opposite side thereof, and supporting plates adjoining the scale-removing factors to define the path of the fish.

6. A machine of the class described comprising a conveyor mechanism, a plurality of scale-removing factors having yieldably mounted spills, said conveyor mechanism comprising an endless flexible member movable about supports and having upper and lower runs therebetween, a clamp upon the flexible member, and scale-removing factors adjoining both the upper and lower runs of the flexible member, whereby the conveyor mechanism may drag a fish past a scale-removing factor so that scales are removed from one side thereof, and then turn the fish over and drag the opposite side of the fish past a scale-removing factor to remove the scales from the opposite side thereof, and a curved guide adjoining one of the supports, said guide being arranged to engage a fish body as it is being turned over.

7. A machine of the class described comprising a conveyor mechanism, a plurality of scale-removing factors having yieldably mounted spills, said conveyor mechanism comprising an endless flexible member movable about supports and having upper and lower substantially horizontal runs therebetween, a clamp upon the flexible member, and scale-removing factors adjoining both the upper and lower runs of the flexible member, whereby the conveyor mechanism may drag a fish past a scale-removing factor so that scales are removed from one side thereof, and then turn the fish over and drag the opposite side of the fish past a scale-removing factor to remove the scales from the opposite side thereof, supporting plates adjoining the scale-removing factors to define the path of the fish, and a curved guide adjoining one of the supports, said guide being arranged to engage a fish body as it is turned over.

8. A machine of the class described comprising a conveyor mechanism, a plurality of scale-removing factors having yieldably mounted spills, said conveyor mechanism comprising an endless flexible member movable about supports and having upper and lower horizontal runs therebetween, a clamp upon the flexible member, and scale-removing factors adjoining both the upper and lower runs of the flexible member, whereby the conveyor mechanism may drag a fish past a scale-removing factor so that scales are removed from one side thereof, and then turn the fish over and drag the opposite side of the fish past a scale-removing factor to remove the scales from the opposite side thereof, and means adjoining the upper and lower runs to ensure the clamp remaining closed when the fish is passing the scale-removing factors.

9. A machine of the class described comprising a conveyor mechanism, a plurality of scale-removing factors having yieldably mounted spills, said conveyor mechanism comprising an endless flexible member movable about supports and having upper and lower substantially horizontal runs therebetween, a clamp upon the flexible member, and scale-removing factors adjoining both the upper and lower runs of the flexible member whereby the conveyor mechanism may drag a fish past a scale-removing factor so that scales are removed from one side thereof, and then turn the fish over and drag the opposite side of the fish past a scale-removing factor to remove the scales from the opposite side thereof, a curved guide adjoining one of the supports, said guide being arranged to engage a fish body as it is turned over, and a plate inclined downwardly from an upper scale-removing factor to direct the fish to the cuved guide.

10. A machine of the class described comprising a conveyor mechanism, a plurality of scale-removing factors having yieldably mounted spills, said conveyor mechanism comprising an endless flexible member movable about supports and having upper and lower substantially horizontal runs therebetween, a clamp upon the flexible member, and scale-removing factors adjoining both the upper and lower runs of the flexible member whereby the conveyor mechanism may drag a fish past a scale-removing factor so that scales are removed from one side thereof, and then turn the fish over and drag the opposite side of the fish past a scale-removing factor to remove the scales from the opposite side thereof, and means properly to position the upper and lower runs in relation to the scale-removing factors.

11. A machine of the class described comprising a conveyor mechanism, a plurality of scale-removing factors having yieldably mounted spills, said conveyor mechanism comprising an endless flexible member movable about supports and having upper and lower substantially horizontal runs therebetween, a clamp upon the flexible member, and scale-removing factors adjoining both the upper and lower runs of the flexible member whereby the conveyor mechanism may drag a fish past a scale-removing factor so that scales are removed from one side thereof, and then turn the fish over and drag the opposite side of the fish past a scale-removing factor to remove the scales from the opposite side thereof, said clamps having pronged portions to engage the fish, the prongs being arranged so that the fish rests thereon after having the scales removed from both sides, means to open the clamp to release the fish, and means to lift the fish from the prongs.

12. A machine of the class described comprising a conveyor mechanism, a plurality of scale-removing factors having yieldably mounted spills, said conveyor mechanism comprising an endless flexible member movable about supports and having upper and lower substantially horizontal runs therebetween, a clamp upon the flexible member, and scale-removing factors adjoining both the upper and lower runs of the flexible member whereby the conveyor mechanism may drag a fish past a scale-removing factor so that scales are removed from one side thereof, and then turn the fish over and drag the opposite side of the fish past a scale-removing factor to remove the scales from the opposite side thereof, and guide means to open the clamp a single time in each circuit, means arranged to remove the fish from the opened clamp and means to facilitate the insertion of another fish therein during this portion of the circuit.

13. A machine of the class described comprising a conveyor mechanism, a plurality of scale-removing factors having yieldably mounted spills, said conveyor mechanism comprising an endless flexible member movable about supports and having upper and lower substantially horizontal runs therebetween, a clamp upon the flexible member, and a scale-removing factor adjoining both the upper and lower runs of the flexible member whereby the conveyor mechanism may drag a fish past a scale-removing factor so that scales are removed from one side thereof, and then turn the fish over and drag the opposite side of the fish past a scale-removing factor to remove the scales from the opposite side thereof, guide means to open the clamp a single time in each circuit, and means to maintain the clamp closed adjoining both the upper and lower runs of the flexible member.

14. A machine of the class described comprising a conveyor mechanism, a plurality of scale-removing factors having yieldably mounted spills, said conveyor mechanism comprising an endless flexible member movable about supports and having upper and lower substantially horizontal runs therebetween, a clamp upon the flexible member, and a scale-removing factor adjoining both the upper and lower runs of the flexible member whereby the conveyor mechanism may drag a fish past a scale-removing factor so that scales are removed from one side thereof, and then turn the fish over and drag the opposite side of the fish past a scale-removing factor to remove the scales from the opposite side thereof, said scale-removing factors comprising brushes arranged to have their peripheral portions movable in a direction counter to that of the nearest portion of the flexible member.

15. A machine of the class described comprising a conveyor mechanism and a plurality of scale-removing factors, said conveyor mechanism comprising endless flexible means and being movable about a continuous circuit, said mechanism being designed to drag a fish past a scale-removing factor so that scales are removed from one side thereof, to turn the fish over and to drag the opposite side of the fish past another scale-removing factor to remove the scales from the opposite side of the fish, means associated with the flexible means to engage a fish and carry it substantially about one continuous circuit, means to guide the runs of the flexible means adjoining the scale-removing factors, said factors including spills thrown outwardly by centrifugal force so that the path of the fish intersects a portion of their circular path.

Signed by me at East Boston, Massachusetts, this 5th day of May, 1928.

ERNEST A. GALLISON.